United States Patent
Chornoby (10) Patent No.: US 10,355,466 B2
(45) Date of Patent: Jul. 16, 2019

(54) APPARATUS AND METHOD FOR ICE AND FROST REMOVAL FROM POWER LINES

(71) Applicants: Manitoba Hydro, Winnipeg (CA); Todd Bland Chornoby, St. Adolphe (CA)

(72) Inventor: Todd Bland Chornoby, St. Adolphe (CA)

(73) Assignee: Todd Bland Chornoby, Winnipeg (CA)

(*) Notice: Subject to any disclaimer, the term of this patent is extended or adjusted under 35 U.S.C. 154(b) by 536 days.

(21) Appl. No.: 14/717,399

(22) Filed: May 20, 2015

(65) Prior Publication Data

US 2016/0020593 A1 Jan. 21, 2016

Related U.S. Application Data (60) Provisional application No. 62/025,659, filed on Jul. 17, 2014.

(51) Int. Cl.
*H02G 7/16* (2006.01)
*B08B 1/00* (2006.01)

(52) U.S. Cl.
CPC .............. *H02G 7/16* (2013.01); *B08B 1/008* (2013.01)

(58) Field of Classification Search
None
See application file for complete search history.

(56) References Cited

U.S. PATENT DOCUMENTS

| | | | |
|---|---|---|---|
| 2001/0015149 A1* | 8/2001 | Montambault | H02G 1/02 104/112 |
| 2004/0065458 A1 | 4/2004 | Hansen | |
| 2008/0276823 A1* | 11/2008 | Montambault | B61B 7/06 104/173.1 |
| 2011/0197919 A1* | 8/2011 | Tilley | B08B 17/02 134/9 |

FOREIGN PATENT DOCUMENTS

| | | |
|---|---|---|
| CA | 2246945 | 3/2000 |
| CA | 2281740 | 3/2000 |
| CN | 201174566 Y | 12/2008 |
| CN | 101369722 | 2/2009 |

(Continued)

OTHER PUBLICATIONS

English Machine Translation for CN101369722.*

*Primary Examiner* — Mikhail Kornakov
*Assistant Examiner* — Pradhuman Parihar
(74) *Attorney, Agent, or Firm* — Ryan W. Dupuis; Ade + Company Inc.; Kyle R. Salterthwaite (57) ABSTRACT

A de-icing apparatus for a flexible conductor, for example a suspended power line, is supported for longitudinal displacement along the conductor. The apparatus has a frame, a motor driven wheel on the frame for rolling engagement along the conductor and at least one guide element supported on the frame so as to be arranged to engage the conductor so as to cause at least one flexion in the conductor when the frame is suspended from the conductor by engagement of the drive wheel and said at least one guide element on the conductor. The propagation of the flexion along the conductor cause ice and snow collected on the conductor to be loosened and fall from the conductor.

19 Claims, 4 Drawing Sheets

(56) References Cited

FOREIGN PATENT DOCUMENTS

| | | |
|---|---|---|
| CN | 101557089 A | 5/2011 |
| CN | 202817672 U | 3/2013 |
| CN | 202906344 U | 4/2013 |
| SE | 9404000 | 5/1996 |
| WO | 0247232 | 6/2002 |
| WO | 2014044915 | 3/2014 |
| WO | WO-2014044915 A1 * 3/2014 ............... H02G 7/16 |

* cited by examiner

APPARATUS AND METHOD FOR ICE AND FROST REMOVAL FROM POWER LINES

This application claims the benefit under 35 U.S.C. 119(e) of U.S. provisional application Ser. No. 62/025,659, filed Jul. 17, 2014.

FIELD OF THE INVENTION

This invention relates in general to an apparatus and method for removing undesired matters, for example ice, hoarfrost, and snow, from power lines or conductors.

BACKGROUND

Extreme and fluctuating weather conditions, including high humidity, below-freezing temperatures, and ice storms, can cause ice to form on power lines or conductors. Ice weight can put a lot of stress on power lines or conductors and damage equipment. In windy conditions, icy lines can whip violently and gallop, causing tie wires, tie assemblies, and other connections, to weaken and break, wood poles to snap, and even steel towers to crumple. Hoarfrost or snow, whilst lower in weight than ice and causes less strain on power lines or conductors, can quickly transform into ice under certain weather conditions which can pose even greater risk due to the element of surprise. Accordingly, removal of extraneous matters such as ice, hoarfrost, and snow, from power lines or conductors must be done as quickly as possible to prevent equipment breakage and loss of power. Without exception, strategic, timely, and safe, keeping power lines clean and free of extraneous matters are of extreme importance.

Although the importance of preventing build-up of extraneous matters on power lines has been universally recognized and acknowledged, the ramifications and immense cost implications of downed power lines due to same have become even greater priority concerns for the electrical industry in light of the increasing adverse weather systems and events across the globe.

In the industry, removal of ice from power lines is commonly done through ice melting and manual ice removal.

Melting is limited to use in certain specific situations on isolated circuits. Ice melting requires certain section of lines to be first de-energized. A controlled short-circuit is placed at one end of the line, and the current flow creates a momentary jolt and temperature increase to heat up the line so to loosen and melt the ice.

Manual removal is also a commonly used process and can be done on energized lines, if required, to minimize outages. Oftentimes, ice can be manually removed on energized distribution lines up to 25 kV, and sub-transmission and transmission lines up to the voltage of 230 kV can be done with the line cleared and grounded.

The ice removal tool is a simple tool that has been conventionally used to manually remove a build-up of ice from overhead conductors. In general, manual ice removal is a labour-intensive procedure that requires many persons and/or a moving vehicle on the ground to pull, using and via fiberglass reinforced plastic (FRP) hotsticks and rope connected to the ice removal tool positioned on top of a power line, and the tool is basically "dragged" along the length of power line to break and shed built-up ice.

Upon reaching the end of a stretch of line and at each structure, the ice removal tool must be manually relocated to the next span by a qualified worker. The ice removal tool must come to a stop before the worker can climb the pole, and must not be pulled again until the worker is back on the ground. Manual ice removal would continue along the many stretches and spans in this fashion until all ice is removed. In our experience, depending on terrain and other environmental factors and the amount of ice buildup, a 10-person crew can on average de-ice roughly 1.6 kilometers of line per hour.

Evidently, manual ice removal is very labor intensive and time-consuming, and therefore expensive, notwithstanding slow, as the conditions and terrains are often very difficult. Past experience has also shown that with all the stops at each pole and the climbing there is a lot of idle manpower and machines.

Considering the importance of line de-icing and the obvious cost implications of the time and labour involved using conventional manual ice removal method, the attractiveness of an automated de-icing apparatus that can improve the practicality, reduce the costs, and increase the speed, of line de-icing has long been sought after.

For instance, since 1999, Manitoba Hydro has invested significant resources in researching and developing a robotic apparatus to try to develop such an automated tool. In 2010, Hydro-Quebec and BCTC received the Edison Award from the Edison Electric Institute in the International Affiliate category for their Line Scout robot that can be manually controlled (via remote) to traverse lines and clear obstacles (insulator strings, vibration dampers, aircraft warning markers, corona rings, etc.). The two sets of designs share some similarities, and while they may be useful for general line inspection, they are not suitable or equipped for rapid de-icing of power lines or conductors.

Notwithstanding, there have been description of devices that can travel (roll) along a conductor and carry special tools for ice removal such as spinning hammer means to hammer and break the ice off the conductor (as exemplified in Chinese Pat. No. 201174566Y); or blades, spikes, and scoops, to chip away ice from the conductor (as exemplified in Chinese Pat. No. 101557089A, Chinese Pat. No. 202817672U, and Chinese Pat. No. 202906344U). Whilst these mechanisms and approaches may in theory be capable of breaking ice off conductors, they can be relatively impractical under cold, windy, icy, and slippery, conditions, and the various tools described can also cause damage to conductors.

Other devices described in the prior art include the use of impact members to produce shock waves along a conductor to cause ice to break and fall from the conductor (as exemplified in Canadian Pat. No. 2,281,740 and Canadian Pat. No. 2,246,945) and the use of electromechanical vibrator to product vibrations on the conductor to break the ice from the conductor (as exemplified in U.S. Patent Application No. 2004/0065458 and International Patent Publication Number WO 02/47232). These are just stationary devices attached to a segment of conductor between pylons and are designed to only remove ice from that segment of conductor.

In view of the foregoing disadvantages of the prior art, it is therefore the primary objective of the present invention to provide novel apparatuses and methods for effective and efficient removal of extraneous matters, such as ice, frost, and snow, from power lines or conductors, that is less labor intensive and less time-consuming than conventional de-icing means.

SUMMARY OF THE INVENTION

An object of the present invention is to provide novel apparatuses for removal of extraneous matters, such as ice, frost, and snow, from power lines or conductors, that is less labor intensive and less time-consuming than conventional means.

Another object of the present invention is to provide methods and applications for the use of the apparatuses of the present invention to improve removal of extraneous matters, such as ice, frost, and snow, from power lines or conductors.

According to a first aspect of the present invention, there is provided an apparatus for removing ice, frost, or snow, from a conductor having a longitudinal axis comprising:

(a) a frame;
(b) a wheel on the frame for rolling engagement along the longitudinal axis of the conductor;
(c) a motor means to drive rotation of the wheel; and
(d) at least one guide element on the frame for engagement with the conductor to cause a flexion in the conductor when the wheel is engaged on the conductor and said flexion is propagated/translocated along the conductor when the wheel is driven by the motor means to move the apparatus along the longitudinal axis of the conductor.

In one embodiment, the at least one guide element is a protrusion of the frame, or simply a part of the frame, that can be biasly pressed against the conductor when the wheel is engaged on the conductor.

In another embodiment, the at least one guide element is a second wheel that can be biasly pressed against the conductor for rolling engagement along the longitudinal axis of the conductor when the first wheel is engaged on the conductor.

Each of the first wheel and the second wheel is substantially cylindrical in structure with an inner opening at the central vertex (forming a hub) and a body spanning generally radially outwardly from the inner opening. Preferably, each of the first wheel and the second wheel is a double-flanged wheel, or a wheel wherein the circumferentially curved surface of the wheel for rolling engagement with the conductor has a concentric recess wherein the conductor fits into the recess when the wheel is engaged on the conductor.

In a preferred embodiment, when the first wheel is engaged on the conductor, the at least one guide element is forcibly engaged to biasly press on the conductor by spring or other similar tension-inducing means exerting sufficient force on the guide element to cause a flexion in the conductor. The flexion in the conductor in turn fractures the brittle ice or frost accumulated on the conductor to dislodge same from the conductor.

Alternatively, the at least one guide element is forcibly engaged to biasly press on the conductor by load force exerted via lever action, such as a class 1 lever.

In order to fracture and dislodge ice or frost from a length of conductor (instead of just a single point in the conductor), the flexion in the conductor caused by the at least one guide element and the first wheel needs to be propagated/translocated along the longitudinal axis of the conductor in a wave-like fashion. To effect the propagation/translocation of the guide element and the first wheel along the longitudinal axis of the conductor, the first wheel is rotatably driven by motor means to roll along the longitudinal axis of the conductor, thereby propelling the rest of the apparatus of the present invention (including the guide element) along the length of conductor.

In the event the guide element is a second wheel biasly pressed against the conductor for rolling engagement, the second wheel may be driven by same or different motor means in concert with or in lieu of the first wheel.

In one embodiment, the motor means is an internal combustion engine motor or an electric motor. In either instance, the motor may be positioned in or on the frame and transmits its mechanical power to one or both wheel(s) via chain drive or belt drive means. Alternatively, the motor means may be incorporated directly within the first and/or second wheel supplied by fuel or electricity from a fuel tank or battery positioned in or on the frame.

Wheel speed and the amount of torque applied to the wheel(s) may be controlled by conventional throttle, clutch, and/or gear, means in the case of an internal combustion engine motor, or via electronic control (e.g. variable resistor) in the case of an electric motor. It should be readily appreciated that such control means can also be used to reverse the direction of wheel rotation so to enable the apparatus of the present invention to travel forwards and backwards along the longitudinal axis of the conductor.

When the apparatus of the present invention is propelled along the longitudinal axis of a conductor, sometimes it will encounter and need to slow down and traverse obstacles. Relatively small obstacles may include uneven ice build ups and spiral-type vibration dampeners which are more so irregularities on the surface of the conductor. At a slower speed and provided that the spacing between the flanges (i.e. the recess) of the wheel(s) is sufficiently large to accommodate the size of these irregularities, the apparatus of the present invention can easily traverse such obstacles.

In the field, the apparatus of the present invention will also need to sometimes traverse more substantial obstacles such as stockbridge-type vibration dampeners clamped onto the conductor as well as insulators that connects to the conductor at each tower or utility pole. While the actual connection point where the conductor is attached to each dampener or insulator is relatively small and can often be accommodated within the spacing between the flanges (recess) of the wheel(s), the actual body of a stockbridge dampener or insulator is sufficiently large in blocking the direct path of travel for the apparatus of the present invention. For instance, a stockbridge dampener is usually disposed on the underside of the conductor hence would block the travel of the frame of the apparatus, whereas a suspension-type insulator is disposed above the insulator thereby blocking the travel of a wheel of the apparatus.

Accordingly, in order to avoid collision of the apparatus of the present invention into these obstacles, the frame and/or wheel of the apparatus would need to be temporarily displaced and detoured around the obstacle while the apparatus travels past the obstacle.

To effect such temporary displacement and detour of the frame or wheel around the obstacle, one or more deflector guide element(s) is positioned on the frame for rotating the apparatus about the longitudinal axis of the conductor. Preferably, the deflector guide element is a parabolic convexo-concave deflector with the apparatus positioned substantially at or near its focal point (along the latus rectum) and its directrix aligned substantially in parallel with the longitudinal axis of the conductor.

When the apparatus approaches an obstacle, the leading arm of the deflector would contact the obstacle first. As the apparatus continues to travel along the conductor, the obstacle would slide along the convex side of the deflector and its curvature would deflect the apparatus away from the obstacle. In one embodiment, the apparatus would be tilted about the longitudinal axis of the conductor when it is displaced by the deflector (and would reach maximum tilt/displacement when the obstacle reaches the vertex of the deflector). Obviously, the curvature required of the deflector should be commensurate with the size of the obstacle that needs to be traversed.

It should be readily apparent to persons skilled in the art that the positioning of the deflector would depend on the position of the obstacle to be traversed, and preferably, the deflector should be positions at or about the same height as the obstacle.

According to another aspect of the present invention, there is provided a method of removing ice, frost, or snow, from a length of conductor having a longitudinal axis comprising:

(a) engaging a first wheel onto the conductor;
(b) engaging at least one guide element on the frame onto the conductor to cause a flexion in the longitudinal axis of the conductor when the first wheel is engaged on the conductor; and
(c) driving said first wheel with motor means to roll along the length of the conductor to propagate/translocate said flexion along the length of the conductor.

Other objects, features and advantages of the present invention will become apparent from the following detailed description. It should be understood, however, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

For a more detailed disclosure of the invention and for further objects and advantages thereof, reference is to be had to the following description taken in conjunction with the accompanying drawings, in which.

DETAILED DESCRIPTION

Referring to the accompanying figures there is illustrated novel apparatuses for removal of extraneous matters, such as ice, frost, and snow, from power lines or conductors, that is less labor intensive and less time-consuming than conventional means.

Figure 1A:
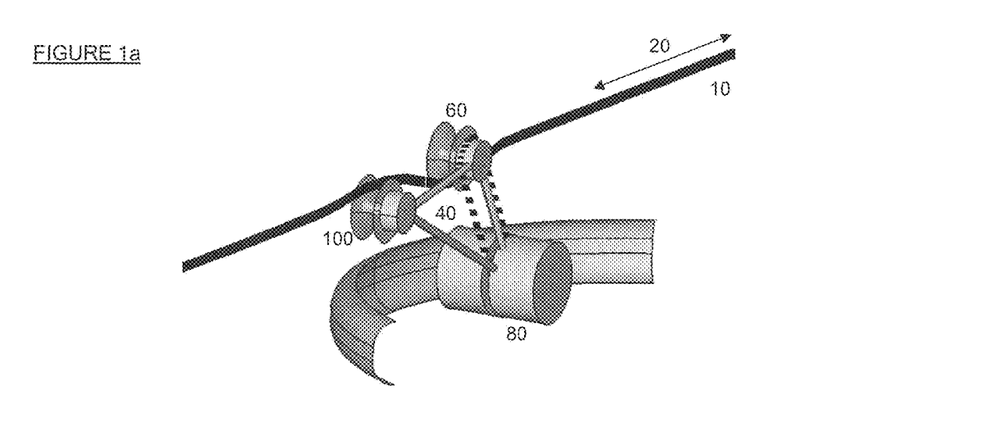
FIG. 1a is a perspective view of a first example of the apparatus of the present invention and its relative positioning on a conductor.
Figure 1B:
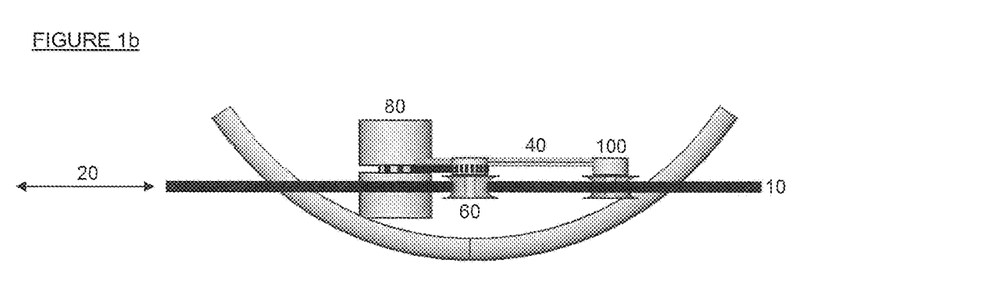
FIG. 1b is a top plan view of a first example of the apparatus of the present invention and its relative positioning on a conductor.
Figure 1C:
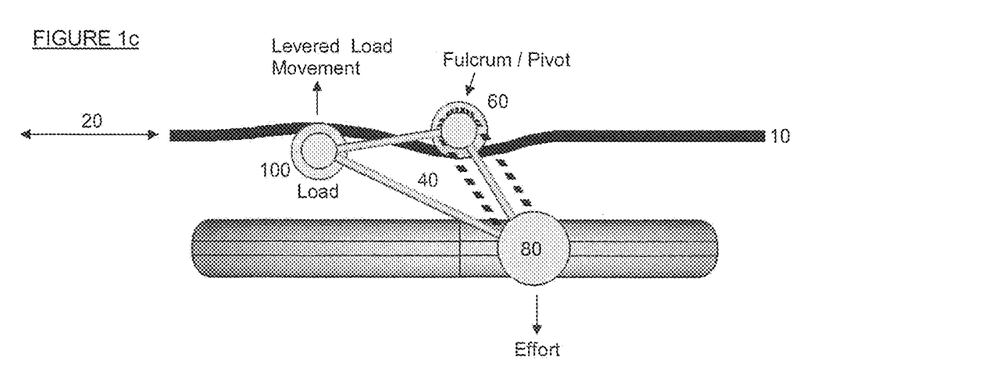
FIG. 1c is a front view of a first example of the apparatus of the present invention and its relative positioning on a conductor.

FIG. 1 is a series of depiction of a first example of the apparatus of the present invention which is shown in perspective view (FIG. 1a), top plan view (FIG. 1b), and front view (FIG. 1c), in relation with its positioning on a length of conductor 10 having a longitudinal axis 20.

According to the illustration, the apparatus of the present invention comprises:

(a) a frame 40;
(b) a wheel 60 on the frame for rolling engagement along the longitudinal axis 20 of the conductor 10;
(c) a motor means 80 to drive rotation of the wheel 60;
(d) at least one guide element on the frame 40 for engagement with the conductor to cause a flexion in the longitudinal axis 20 of the conductor 10 when the wheel 60 is engaged on the conductor 10, and said flexion is propagated/translocated along the conductor when the wheel 60 is driven by the motor means 80 to move the apparatus along the longitudinal axis 20 of the conductor 10.

The basic purpose of frame 40 is essentially to serve as a chassis of the apparatus of the present invention. As such, it is preferably made of a material of sufficient dimensional rigidity and stability for the structural support of the parts and components of the apparatus. In one embodiment, considering that the apparatus of the present invention comes into contact with conductor 10 that may be energized, frame 40 may be made of a non-conductive material (such as a polymer composite) of sufficient tensile, compressional, flexural, and torsional, strength. That being said, the use of semi-conductive or conductive materials should not be precluded so long as the procedures for its mounting and unmounting on and from the conductors are conducted carefully to prevent flashovers or electrocution because of grounding.

In addition to the chassis function, a part of the frame 40, such as a protrusion of the frame, can also serve as the at least one guide element that can be biasly pressed against the conductor when the wheel is engaged on the conductor. For the illustration herein, however, the at least one guide element is a second wheel 100 that can be biasly pressed against the conductor 10 for rolling engagement along the longitudinal axis 20 of the conductor 10 when the first wheel 60 is engaged on the conductor 10.

Both the first wheel 60 and the second wheel 100 in this illustration are double-flanged wheels wherein the circumferentially curved surface of each of the wheels 60 and 100 has a concentric recess wherein the conductor 10 fits into the recess when each wheel is engaged on the conductor.

When the first wheel 60 is engaged on the conductor 10, the second wheel 100 is forcibly engaged on the conductor 10 to biasly press on conductor 10 to cause a flexion in the longitudinal axis 20 of conductor 10. The flexion in the conductor 10 in turn fractures the brittle ice or frost accumulated on the conductor to dislodge same from the conductor 10.

The forcible engagement of the second wheel 100 onto conductor 10 while the first wheel 60 is engaged on the conductor 10 may be effected by spring means that, for example, are disposed in a manner to exert sufficient force to biasly move the first wheel 60 and the at least one guide element 100 (e.g. the second wheel 100) towards each other.

Alternatively, the at least one guide element (e.g. the second wheel 100) is forcibly engaged to biasly press on the conductor 10 by load force exerted via lever action (see FIG. 1c as example), wherein the first wheel 60 engaged on the conductor 10 acts as a fulcrum or pivot, the guide element 100 longitudinally spaced and positioned on one side of the fulcrum represents the load, and weight of the motor means 80 longitudinally spaced and positioned on the other side of the fulcrum serves as effort. The type of lever is preferably a class 1 lever.

It should be readily apparent to a skilled person in the art that the relative longitudinal distances along the axis of the conductor of the load and effort from the fulcrum should be determined in a manner to allow sufficient force to be generated and exerted on the guide element 100 to cause it to sufficiently move and force a flexion in the conductor 10. Depending on the thickness or gauge of the conductor 10, it should also be apparent that the weight (hence force) exerted by the motor means 80 on the effort side of the lever can be adjusted, for example by adding weight ballasts, to optimize the degree of flexion in the conductor 10 so that sufficient flexion is attained to fracture the accumulated ice or frost but not over-flexion that may damage the conductor 10. Similarly, the ratio between the longitudinal distance between the first wheel 60 (fulcrum) and the motor means 80 (effort) and the longitudinal distance between the first wheel 60 (fulcrum) and the at least one guide element (e.g. the second wheel 100) (effort) can also be adjusted to alter the force exerted on the load (hence the amount of load movement) so to optimize the degree of flexion in the conductor 10.

In order to fracture and dislodge ice or frost from a length of conductor 10 (instead of just a single point in the conductor), the flexion in the conductor 10 caused by the first wheel 60 and the at least one guide element (e.g. second wheel 100) needs to be propagated/translocated along the longitudinal axis 20 of the conductor 10 in a wave-like fashion. To effect the propagation/translocation of the flexion along the conductor 10, the first wheel 60 and the guide element (e.g. second wheel 100) would both need to be propagated/translocated in tandem along the longitudinal axis 20 of the conductor 10 (with the force biasing them towards each other being maintained while in motion).

To effect the drive, the first wheel 60 is rotatably driven by motor means 80 to roll along the longitudinal axis 20 of the conductor 10, thereby propelling the rest of the apparatus of the present invention (including the guide element) along the length of conductor 10. In the event the guide element is a second wheel 100 biasly pressed against the conductor for rolling engagement, this second wheel 100 may be driven by same or different motor means 80 in concert with or in lieu of the first wheel 60.

When biasing the guide element 100 relative to the drive wheel towards a deflected position away from the longitudinal axis of the conductor by use of a center of gravity of the apparatus which is longitudinally offset from the drive wheel 60 functioning as a fulcrum, only a single guide wheel 100 diametrically opposite from the drive wheel can be used effectively as shown in FIGS. 1a through 1c (although additional guide wheels may be used if desired) to cause a first flexion about the drive wheel and a second flexion about the guide element at a longitudinally spaced locations along the conductor. In this instance, only the drive wheel, or both the drive wheel and the guide wheel may be driven to rotate by the motor.

Figure 2A:
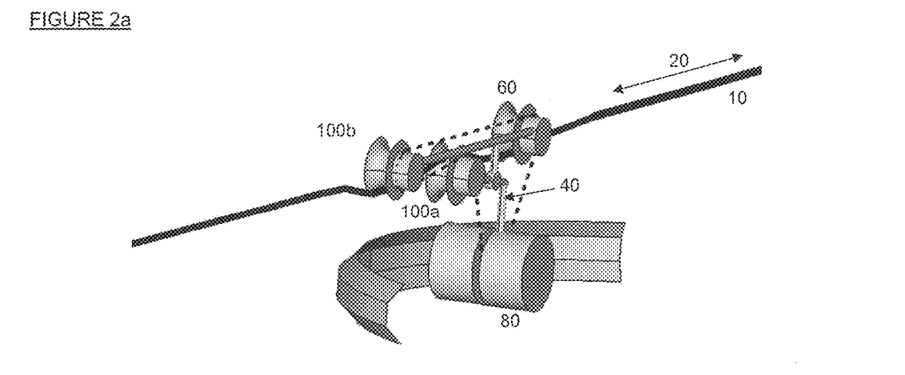
FIG. 2a is a perspective view of a second example of the apparatus of the present invention and its relative positioning on a conductor.
Figure 2B:
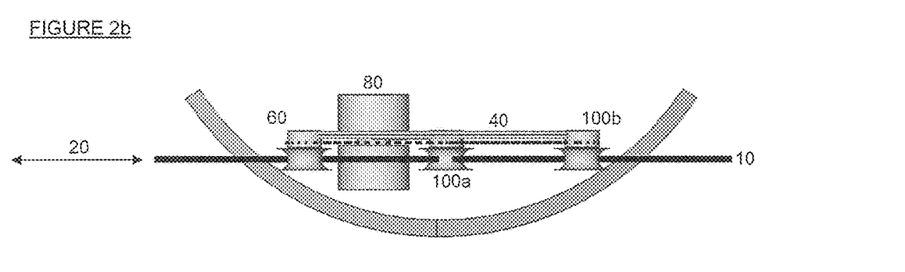
FIG. 2b is a top plan view of a first example of the apparatus of the present invention and its relative positioning on a conductor.
Figure 2C:
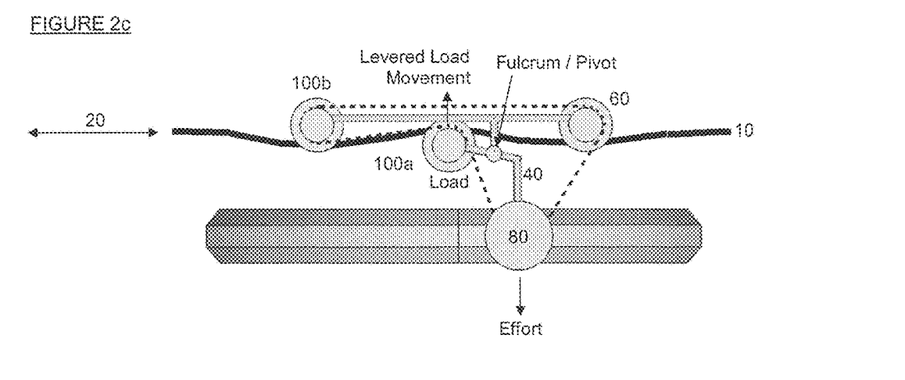
FIG. 2c is a front view of a first example of the apparatus of the present invention and its relative positioning on a conductor.

Alternatively, as shown in FIGS. 2a to 2c, the guide element may comprises a first auxiliary wheel 100a diametrically opposite the drive wheel and a second auxiliary wheel 100b engaging the same side of the conductor as the drive wheel in which the first auxiliary wheel 100a is longitudinally positioned between the drive wheel and the second auxiliary wheel 100b. In this instance, the drive wheel 60 and the second auxiliary wheel 100b define a longitudinal path through the frame substantially in alignment with the longitudinal axis of the conductor, and the first auxiliary wheel 100a is spring biased relative to the frame towards the drive wheel and the second auxiliary wheel 100b on the opposing side of the conducted. Accordingly a portion of the conductor passing through the frame is deflected upwardly away from both i) the longitudinal path through the housing defined by the drive wheel and the second auxiliary wheel 100b and ii) the longitudinal axis of the remainder of the conductor, to an upwardly deflected position. In this instance, the guide elements and the drive wheel cause flexion of the conductor about each of the drive wheel, the first auxiliary wheel, and the second auxiliary wheel at longitudinally spaced apart positions. In this instance, the motor may drive rotation of: i) only the drive wheel, ii) the drive wheel and one of the auxiliary wheels, or iii) the drive wheel and both of the guide wheels to drive the apparatus longitudinally along the conductor.

In one embodiment, the motor means 80 is an internal combustion engine motor. With the advancement in electric motor and battery technology, the motor means 80 may also be an electric motor. In either instance, the motor may be positioned in or on the frame 40 and transmits its mechanical power to one or both wheel(s) via chain drive or belt drive means. Alternatively, the motor means 80 may be incorporated directly within the first wheel 60 and/or second wheel 100 supplied by fuel or electricity from a fuel tank or battery positioned in or on the frame 40, preferably at the same location of motor means 80 depicted in FIG. 1 when it is frame-mounted so that the fuel tank or battery can provide the substitute weight (and effort force) needed for effecting the lever action.

Wheel speed and the amount of torque applied to the wheel(s) may be controlled by conventional throttling means used to control internal combustion engine motor speed or by conventional variable/adjustable speed drive means (such as variable resistors) used to control electric motor speed. Further, Wheel speed and the amount of torque applied to the wheel(s) may additionally be controlled by conventional clutch, and/or gear, means arranged between the motor means 80 and the wheel(s) being driven. Yet further, such control means can also be used to reverse the direction of rotation of wheel 60 (and wheel 100 if driven) so to enable the apparatus of the present invention to travel forwards and backwards along the longitudinal axis 20 of conductor 10. It should be readily appreciated that such control means may be operated and adjusted via remote control means by an operator at ground level, and alternatively it may be operated and adjusted by computer programmed-actuator means that are on-board the apparatus. For instance, based on pre-existing knowledge of the exact geographic location and lengths of the conductor spans (as well as the extent of ice-build-up on each span) and the exact geographic location of the towers supporting each span of conductor, the speed and direction of travel of the apparatus can be accordingly be pre-planned and controlled on a real-time basis using global positioning system (GPS) data on the location and vectoring of the apparatus at any given time.

Considering that the apparatus of the present invention needs to work under cold, windy, and icy, conditions, whilst the rolling surface of the wheel(s) that is in contact with the conductor 10 may have a smooth surface, a textured surface is preferred for increasing friction/traction against the surface of the conductor 10. The textured surface may include protrusions such as studs, spikes, cogs, and/or concentric rims. The wheel(s) is preferably made of a non-conductive material (or electrical insulator), such as rubber-like polymers, although the composition of the textured protrusions can be made of a harder material (such as a metal) that can better hold an edge or a point. For durability and ease of rolling, the hub of the wheel(s) may also be made of a metallic material and incorporate mechanisms such as rolling-element (ball or roller bearings) so long as there is sufficient mechanism(s) in place to insulate against current flow from conductor 10 to the rest of the apparatus of the invention.

When the apparatus of the present invention is propelled along the longitudinal axis 20 of conductor 10, sometimes it will encounter and need to traverse obstacles in its path of travel. Relatively small obstacles may include uneven ice build ups and spiral-type vibration dampeners which are more so irregularities on the surface of the conductor 10. At a slower speed and provided that the size of the recess of the first wheel 60 (and second wheel 100 when applicable) is sufficiently large to accommodate the size of these irregularities (and that the irregularities can fit within the recess), the apparatus of the present invention can easily traverse such obstacles.

At times, the apparatus of the present invention will also need to traverse more substantial obstacles such as stockbridge-type vibration dampeners clamped onto the conductor as well as insulators that connects to the conductor at each tower or utility pole. While the actual connection point where the conductor is attached to each dampener or insulator is relatively small and can be accommodated within the spacing between the flanges of the wheel(s), the actual body of a stockbridge dampener or insulator can be sufficiently large in blocking the direct path of travel for the apparatus of the present invention. For instance, a stockbridge dampener is usually disposed on the underside of the conductor hence would block the travel of the frame of the apparatus, whereas a suspension-type insulator is disposed above the insulator thereby blocking the travel of a wheel of the apparatus.

Figure 3A:
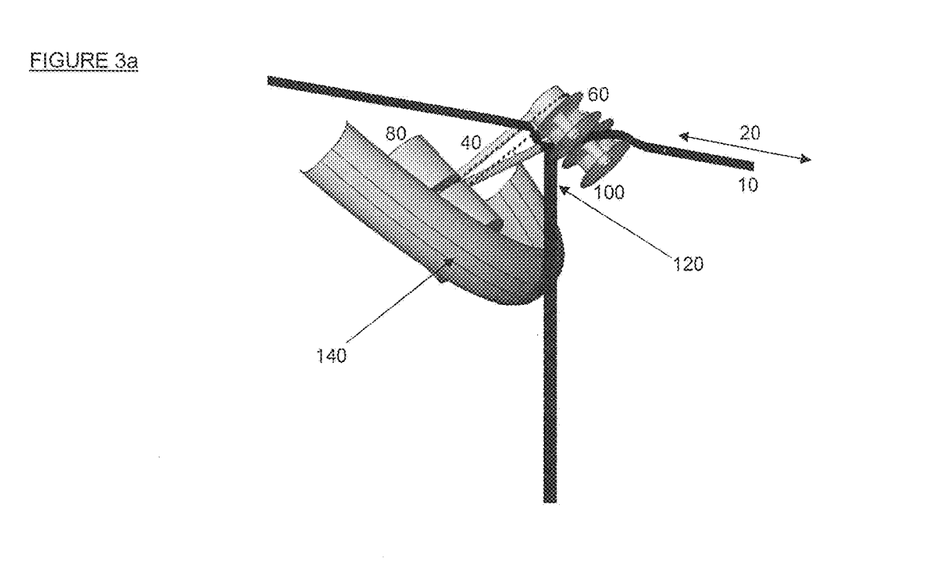
FIG. 3a is a first perspective view of a first example of the apparatus of the present invention traversing an obstacle.
Figure 3B:
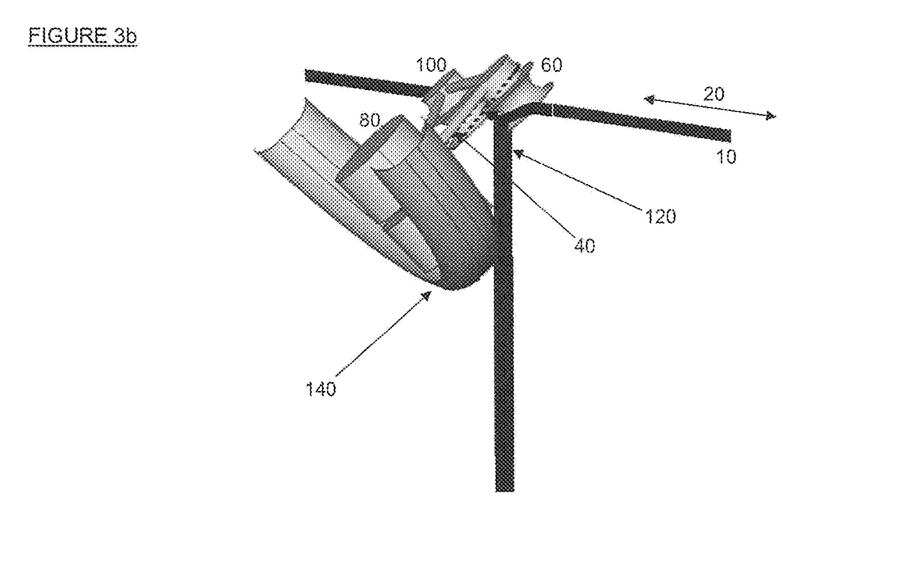
FIG. 3b is a second perspective view of a first example of the apparatus of the present invention traversing an obstacle.

For the purpose of illustration, FIGS. 3a and 3b present (two perspective views of) an example wherein an obstacle 120 is disposed on the underside of the conductor 10 hence would block the travel of the apparatus of the present invention. In order to avoid collision of the apparatus into obstacle 120, the frame 40 and the wheels 60 and 100 of the apparatus would need to be temporarily swung aside and detoured around obstacle 120 while the apparatus travels past obstacle 120. In one embodiment, such temporary lateral displacement of the frame 40 and wheels 60 and 100 around the obstacle 120 is effected by one or more deflector guide element(s) 140. In this example, deflector guide element 140 is a elongated curved structure that is affixed to and around one side of the frame 40 of the apparatus and the longitudinal axis of deflector guide element 140 is aligned substantially parallel with the longitudinal axis 20 of conductor 10. As the apparatus of the present invention travels along conductor 10 and approaches obstacle 120, the leading portion of deflector guide element 140 would first contact obstacle 120. As the apparatus continues its course along conductor 10 towards obstacle 120, the curvature of deflector guide element 140 would glide along and skirt around obstacle 120 and correspondingly displacing and swinging frame 40 of the apparatus to one side and steering frame 40 of the apparatus around obstacle 120. Similarly, while frame 40 of the apparatus is being swung to one side away its normally vertically down position, wheel 100 which is also normally disposed under conductor 10 would also be swung aside in the same direction about the longitudinal axis 20 of conductor 10 to avoid direct collision into obstacle 120. At the same time, wheel 60 which is normally disposed on top of conductor 10 would be swung aside in the opposite direction about the longitudinal axis 20 of conductor 10.

Figure 4A:
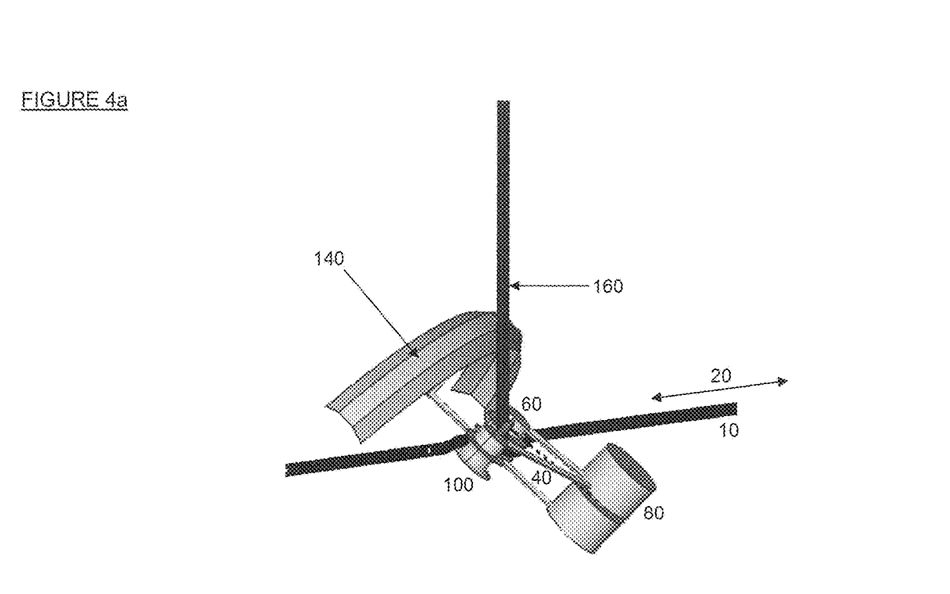
FIG. 4a is a first perspective view of a second example of the apparatus of the present invention traversing an obstacle.
Figure 4B:
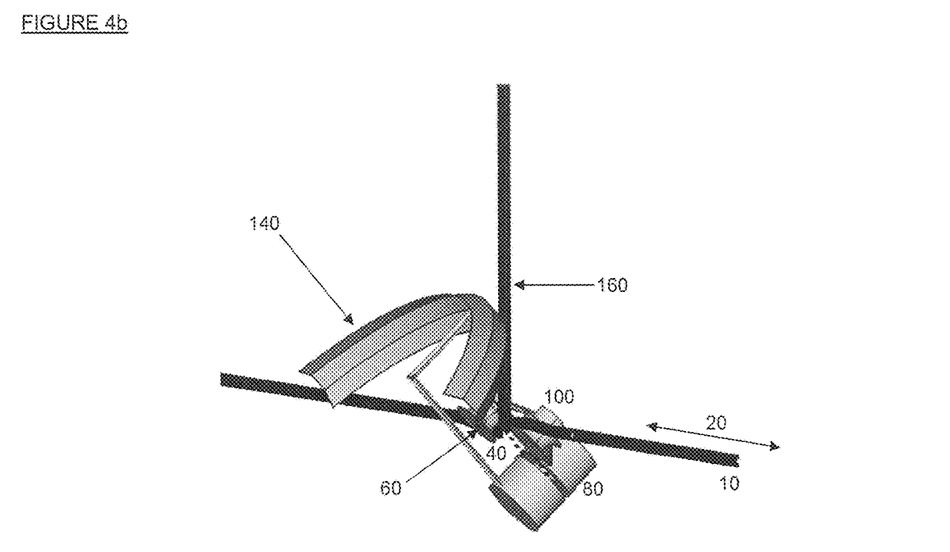
FIG. 4b is a second perspective view of a second example of the apparatus of the present invention traversing an obstacle.

Otherwise, referring to FIGS. 4a and 4b, if the obstacle is positioned above the longitudinal axis 20 of the conductor 10 (now obstacle 160) blocking the path of travel of the apparatus (e.g. when the conductor 10 is hung off an insulator that is hung off a cross arm of a pylon), then the deflector guide element 140 should be positioned above the apparatus, albeit still aligned substantially parallel to the longitudinal axis 20 of the conductor 10. Again, as the apparatus of the present invention travels along conductor 10 and approaches obstacle 160, the leading portion of deflector guide element 140 would first contact obstacle 160. As the apparatus continues its course along conductor 10 towards obstacle 160, the curvature of deflector guide element 140 would again glide along and skirt around obstacle 160 but this time displacing and swinging frame 40 of the apparatus to the opposite side of obstacle 160 to steering frame 40 around obstacle 160. Similarly, while deflector guide element 140 is skirted to one side of obstacle 160, wheel 60 which is also normally disposed on top of conductor 10 would also be swung aside in the same direction about the longitudinal axis 20 of conductor 10 to avoid direct collision into obstacle 160. At the same time, wheel 100 which is normally disposed under conductor 10 would be swung to the other side about the longitudinal axis 20 of conductor 10.

For either of the foregoing scenarios, it should be readily apparent to persons skilled in the art that the amount of curvature required for deflector guide element 140 should be commensurate with the amount of deflection that is required to displace frame 40 of the apparatus around the obstacle 120/160, for example, depending on the size (width) of the obstacle 120/160 at the level of frame 40. Similarly, the size (width) of the obstacle 120/160 at the levels of wheels 100 and 60, and the amount of lateral rotation about the longitudinal axis 20 of conductor 10 that would be required of each wheels to clearly go around obstacle 120/160, should also be considered when determining the amount of curvature required of the deflector guide element 140.

Further, deflector guide element 140 is preferably made of (or coated with) material of sufficient dimensional rigidity and stability so to preserve the curvature during its contact/glide with obstacle 120/160 and of low wear and coefficient of friction (static and/or sliding) such as Polytetrafluoroethylene (Teflon™) and Polytetrafluoroethylene (Delrin™) for easy gliding against the obstacle 120/160.

Yet further, the flange of the double-flanged wheel 60 (positioned on top of the conductor 10) that faces upwards when it is tilted about the longitudinal axis 20 of conductor 10 can preferably have a larger circumference (than the flange that faces down) so to minimize the risk of the wheel 60 slipping off the conductor 10 while tilted.

According to another aspect of the present invention, there is provided a method of removing ice, frost, or snow, from a length of conductor 10 having a longitudinal axis 20 comprising:

(a) engaging a first wheel 60 onto the conductor 10;

(b) engaging at least one guide element 140 on the frame 40 onto conductor 10 to cause a flexion in the longitudinal axis 20 of the conductor 10 when the first wheel 60 is engaged on the conductor 10; and (c) driving said first wheel 60 with motor means 80 to roll along the length of the conductor 10 to propagate/translocate said flexion along the length of the conductor 10.

The foregoing detailed description of the various components of the apparatus, and the preferred embodiments and examples associated therewith, may be applied mutatis mutandis to this method of the present invention.

Having illustrated and described the principles of the invention in a preferred embodiment, it should be appreciated to those skilled in the art that the invention can be modified in arrangement and detail without departure from such principles. All modifications coming within the scope of the following claims are to be claimed.

All publications, patents and patent applications referred to herein are incorporated by reference in their entirety to the same extent as if each individual publication, patent or patent application was specifically and individually indicated to be incorporated by reference in its entirety.

The embodiments of the invention in which an exclusive property or privilege is claimed are defined as follows:

1. An apparatus in combination with a flexible conductor extending along a respective longitudinal axis for removing ice, frost, or snow from the flexible conductor, the apparatus comprising:
   (a) a frame;
   (b) a drive wheel rotatably supported on the frame and arranged for rolling movement longitudinally along the conductor;
   (c) a drive motor operatively connected to the drive wheel so as to be arranged to drive rotation of the drive wheel to displace the frame longitudinally along the conductor; and
   (d) at least one guide element supported on the frame so as to be movable along the conductor together with the rolling movement of the drive wheel along the conductor;
   wherein said at least one guide element engages the conductor so as to cause at least one flexion in the conductor when the frame is suspended from the conductor by engagement of the drive wheel and said at least one guide element on the conductor; and
   wherein said at least one guide element is supported on the frame and engages the conductor so as to maintain said at least one flexion as the drive motor displaces the frame longitudinally along the conductor;
   whereby said at least one guide element propagates said at least one flexion continuously along the conductor as the drive motor displaces the frame longitudinally along the conductor.

2. The apparatus according to claim 1 wherein said at least one guide element is biased relative to the longitudinal axis of the conductor towards a deflected position which is offset from the longitudinal axis of the conductor.

3. The apparatus according to claim 2 wherein a center of gravity of the apparatus is longitudinally offset from the drive wheel such that said at least one guide element is biased towards the deflected position by gravity.

4. The apparatus according to claim 3 wherein the drive motor is supported on the frame longitudinally offset from the drive wheel.

5. The apparatus according to claim 1 wherein said at least one flexion includes a flexion about the drive wheel.

6. The apparatus according to claim 1 wherein said at least one flexion includes a flexion about said at least one guide element.

7. The apparatus according to claim 1 wherein said at least one flexion includes a first flexion about the drive wheel and a second flexion about said at least one guide element at a longitudinally spaced location along the conductor from the first flexion.

8. The apparatus according to claim 1 wherein the drive wheel and said at least one guide element are arranged to engage diametrically opposing sides of the conductor.

9. The apparatus according to claim 1 wherein said at least one guide element comprises an auxiliary wheel arranged for rolling engagement longitudinally along the conductor.

10. The apparatus according to claim 1 wherein said at least one guide element comprises two longitudinally spaced apart auxiliary wheels arranged for rolling engagement longitudinally along the conductor.

11. The apparatus according to claim 10 wherein at least of the two auxiliary wheels is driven to rotate by the drive motor.

12. The apparatus according to claim 1 wherein said at least one guide element is fixed relative to the frame and is arranged for sliding engagement along the conductor.

13. The apparatus according to claim 2 wherein said at least one guide element is biased by a spring element.

14. The apparatus according to claim 1 wherein the drive motor is supported on the frame.

15. The apparatus according to claim 1 wherein the drive motor is supported on the drive wheel.

16. The apparatus according to claim 1, for use with a conductor including a fixed obstacle in proximity thereto, wherein the apparatus further comprises at least one deflector element supported on the frame in fixed relation to the frame, said at least one deflector element being shaped so as to be arranged to pivot the frame including the drive wheel, the drive motor, and said at least one guide element supported on the frame about the longitudinal axis of the conductor into a deflected position of the frame responsive to said at least one deflector element engaging said fixed obstacle as the apparatus is displaced longitudinally towards said obstacle.

17. An apparatus for removing ice, frost, or snow from a flexible conductor extending a respective longitudinal axis including a fixed obstacle in proximity to the conductor, the apparatus comprising:
   (a) a frame;
   (b) a drive wheel rotatably supported on the frame so as to be arranged for rolling engagement longitudinally along the conductor;
   (c) a drive motor operatively connected to the drive wheel so as to be arranged to drive rotation of the drive wheel to displace the frame longitudinally along the conductor;
   (d) at least one guide element supported on the frame so as to be movable along the conductor together with the rolling movement of the drive wheel along the conductor and so as to be arranged to engage the conductor so as to cause at least one flexion in the conductor when the frame is suspended from the conductor by engagement of the drive wheel and said at least one guide element on the conductor; and
   (e) at least one deflector element supported on the frame in fixed relation to the frame, said at least one deflector element being shaped so as to be arranged to pivot the frame including the drive wheel, the drive motor, and said at least one guide element supported on the frame about the longitudinal axis of the conductor into a deflected position of the frame responsive to said at least one deflector element engaging said fixed obstacle while the apparatus is displaced longitudinally along the conductor.

18. The apparatus according to claim 17 wherein said at least one deflector element is supported above the drive wheel.

19. The apparatus according to claim 17 wherein said at least one deflector element is supported below the drive wheel.

\* \* \* \* \*